Patented Nov. 7, 1950

2,529,335

UNITED STATES PATENT OFFICE 2,529,335

PREPARATION OF A HEAT INSULATING MATERIAL FROM PEAT

John Gundersen Helland and Ragnar Eyolf Leonhard Moen, Skien, Norway

No Drawing. Application December 29, 1947, Serial No. 794,418. In Norway January 21, 1947

2 Claims. (Cl. 92—6)

This invention relates to the preparation of a highly efficient heat insulating material from peat. In accordance with the invention the peat is subjected to treatment whereby it is rendered uniform, heat insulating, water repellent and mechanically strong when pressed into formed bodies.

For preparation of the new product, only peat of an intermediate degree of transformation viz. bog-moss peat is used.

The raw peat is at first torn into pieces, then it is heated in a moist atmosphere until the temperature attains about 80° C., whereupon the product so obtained is transferred to an apparatus in which it is rinsed with water of the same temperature. The peat mass so washed is transferred to a closed kneading or puddling machine, in which the mass is kneaded or puddled without the fibres being torn to smaller pieces; if desired the mass may, during such treatment, be heated to about 100° C. by introduction of steam. By the treatment just described the cell walls of the fibres are disintegrated or dissolved to such an extent, that the water previously colloidally combined or fixed in the mass now may be more easily released. From the kneading or puddling apparatus the mass is transferred to a press, in which the mass is given a desired shape; or the mass may be transferred directly to a drying apparatus, if it is desired to use the mass in the form of a mass of loose fibres.

Decisive for this part of the process are the following features:

(a) The several fibres should not be torn into pieces or be destroyed.

(b) The peat must, as far as possible, be freed from foreign bodies.

(c) The temperature should increase uniformly from the first heating in a moist atmosphere to the pressing operation.

After the pressing operation the plates then formed are dried, in what is here called

Drying step 1

This part of the drying may take place in free air for so long a period that the moisture content of the plates is lowered to 35-40%. The plates should not be subjected to direct sun light. The drying operation may also take place artificially within a drying chamber at a temperature of 25-30° C. using an air exchange of about 3 m./sec. This part of the drying must not be effected at so high temperature that a hard film is formed on the plates, since such film would prevent the moisture contained within the plates from escaping.

When the moisture content has been reduced to 35-40% the plates are brought into a drying chamber 18 m. long, which is here called

Drying step 2

In this chamber the drying process is a continuous one, the plates entering the drying chamber from the rear thereof and moving slowly in opposite direction to the current of air. The temperature of this stage is maintained at 60-90° C. The rearmost plates will become heated to a relatively low degree. As the plates are pushed forwards, towards the inlet of the heated air, they successively become hotter, and by being maintained for a sufficient period of time in such heating zone they will be uniformly heated throughout. Due to the process to which the peat was subjected prior to the pressing operation, the peat now easily gives off that portion of its water content which mainly consisted of colloidally combined water, which water content is difficult to remove from peat that has not been so treated. Also in this step it is important that no hard outer film be formed, but the drying must take place uniformly throughout the entire plate. At the same time it is necessary that the temperature be maintained at 60-90° C. the evaporation taking place very rapidly within this temperature range, and the fresh air should be admitted at high speed, e. g. 15 to 20 m./sec. through the inlet openings. If the external air to be used contains too much moisture it is predried by being passed through a cooling chamber before being admitted into the drying chamber. The object of this drying method is to remove the moisture substantially uniformly through the entire cross section of the plates.

Possibly the same result may be attained by drying the plates continuously in several zones, according to a prior, known Swedish method. In the latter method of the air circulates around the plates, transversely to the longitudinal direction of the chamber, the moisture content being gradually reduced by supplying fresh air as the plates are passing the several zones.

Possibly the same result also might be attained by drying by means of infra-red rays, according to a method known per se.

When the volume weight of the plates has been reduced to about 200 kgs./m.$^3$, they are transferred to another drying chamber, which is here called

Drying step 3

In this chamber the plates are heated to 120–140° C., or higher. The final temperature may vary somewhat, but should be so high that the peat is very close to altering its structure. The plates remain in this chamber until their outer surfaces become hard. In this drying step, which also might be called the hardening or water-repellent-making step (heating to 120° C. by known method) the mass becomes water repellent and a hard surface film is formed that makes the plates more resistive.

By the treatment described the major amount of such undesirable foreign substances that have not the insulating properties of peat fibres are removed. Further, such treatment regulates the relative positions of the several fibres, whereby a far more uniform composition is obtained. The mass becomes more porous and allows for an easier vaporisation of the moisture and for a uniform heating, and the heat conduction coefficient becomes very low, and formation of cracks or fissures is avoided.

It is previously known to make some materials water repellent by heating to 130° C. (see the Norwegian patent specification No. 38,016). In the case of peat, however, this process alone is not satisfactory. If peat—for example air dried peat—that has not been torn to pieces and heated in moist air is subjected to said temperature an insulating layer or film is rather rapidly formed on the outer surfaces, and the mass within such film gives off its water content only with great difficulty. In no case is it possible, in this manner, to obtain a peat plate having a thickness of 5 cm. or more which is water repellent throughout. Without the major part of the water contained in peat, inclusive of colloidally combined water, being removed, it is very difficult to heat the interior of a plate to 130° C. or higher without carbonising the outer surface thereof.

Production scheme

The following is an example of a production scheme. It is supposed that 345 m.² of plates are to be produced per 24 hours. For this production 32 m.³ of raw peat must be used. The rate of feeding of the press determines the rate of the described process which includes the steps of tearing to pieces, heating in moist air, washing and kneading. Drying step 1 normally takes place in free air, and requires as a rule several weeks, dependent upon the type of weather prevailing. If artificial drying is used in step 1, a period of time amounting to from 6 or 8 to 24 hours may be necessary. In drying step 2 there will be treated 800–1000 m.² of plates. Each day about 350 m.² of plates, viz. the same quantity that is pressed are removed. The drying period may vary, but on the average is from 2 or 3 to 24 hours. In drying step 3 about 350 m.² plates are hardened daily.

It is supposed that the drying takes place continuously and that the production capacity corresponds to that of the press.

We claim:

1. Process for the production of a uniform, water-repellent, heat-insulating material from bog-moss peat which comprises heating the raw peat in a moist atmosphere up to a temperature of about 80° C., rinsing the peat with water at about 80° C., drying the peat at a temperature not substantially higher than 30° C. to a moisture content of about 35–40 percent, then further drying the peat by gradually increasing the temperature thereof to a temperature within the range from about 60° C. to about 90° C., and finally heating the dried peat to a temperature within the range from about 120° C. to about 140° C.

2. Process as defined in claim 1 in which the drying of the peat at a temperature within the range from about 60° C. to about 90° C. is effected by passing the peat countercurrent to heated air.

JOHN GUNDERSEN HELLAND.
RAGNAR EYOLF LEONHARD MOEN.

REFERENCES CITED

The following references are of record in the file of this patent:

UNITED STATES PATENTS

| Number | Name | Date |
|---|---|---|
| 624,629 | Dickson | May 9, 1899 |
| 751,139 | Beddies | Feb. 2, 1904 |
| 752,022 | Bickford | Feb. 16, 1904 |
| 807,688 | Schlicheysen | Dec. 19, 1905 |
| 2,137,347 | Olsson | Nov. 22, 1938 |

FOREIGN PATENTS

| Number | Country | Date |
|---|---|---|
| 3,656 of 1901 | Great Britain | Feb. 20, 1902 |
| 8,017 of 1908 | Great Britain | July 23, 1908 |
| 480,751 | Great Britain | Feb. 28, 1938 |
| 512,204 | Great Britain | Aug. 30, 1939 |